(12) United States Patent
Kobayashi

(10) Patent No.: US 11,054,571 B2
(45) Date of Patent: Jul. 6, 2021

(54) HEAD-MOUNTED DISPLAY WITH LIMITED HORIZONTAL ROTATION

(71) Applicant: SONY CORPORATION, Tokyo (JP)

(72) Inventor: Toshimi Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/633,702

(22) PCT Filed: May 11, 2018

(86) PCT No.: PCT/JP2018/018235
§ 371 (c)(1),
(2) Date: Jan. 24, 2020

(87) PCT Pub. No.: WO2019/026379
PCT Pub. Date: Feb. 7, 2019

(65) Prior Publication Data
US 2021/0132286 A1 May 6, 2021

(30) Foreign Application Priority Data
Aug. 3, 2017 (JP) ............................. JP2017-150508

(51) Int. Cl.
*F21V 8/00* (2006.01)
(52) U.S. Cl.
CPC ......... *G02B 6/0088* (2013.01); *G02B 6/0015* (2013.01); *G02B 6/0035* (2013.01)
(58) Field of Classification Search
CPC ... G02B 6/0088; G02B 6/0015; G02B 6/0035
See application file for complete search history.

(56) References Cited

U.S. PATENT DOCUMENTS

| 7,418,170 B2 * | 8/2008 | Mukawa ............ G02B 27/0172 385/31 |
| 7,747,113 B2 * | 6/2010 | Mukawa .............. G02B 6/0033 385/31 |

(Continued)

FOREIGN PATENT DOCUMENTS

| CN | 101750738 A | 6/2010 |
| CN | 103995353 A | 8/2014 |

(Continued)

OTHER PUBLICATIONS

International Search Report and Written Opinion of PCT Application No. PCT/JP2018/018235, dated Jul. 24, 2018, 12 pages of ISRWO.

*Primary Examiner* — Andrew Jordan
(74) *Attorney, Agent, or Firm* — Chip Law Group

(57) ABSTRACT

[Problem] To propose a head-mounted display capable of restraining deformation or breakage of a connection member caused by concentration of an external force on the connection member. [Solution] A head-mounted display includes a frame worn on the head of a viewer and having a front part disposed in front of the viewer, and an image display device connected to a central part of the front part. The image display device includes two right and left optical modules each including an image generation device and a light guide member that is connected to the image generation device and is disposed closer as a whole to a center of the face of the viewer than the image generation device, and includes a connection member connecting the image display device to the front part. A part of the image display device is disposed so as to face a part of the front part in a front-rear direction with a predetermined gap interposed therebetween.

15 Claims, 9 Drawing Sheets

(56) References Cited

U.S. PATENT DOCUMENTS

| | | | | |
|---|---|---|---|---|
| 7,936,519 | B2* | 5/2011 | Mukawa | G03B 21/26 359/630 |
| 8,023,783 | B2* | 9/2011 | Mukawa | G02B 5/18 385/31 |
| 8,073,296 | B2* | 12/2011 | Mukawa | G02B 27/0103 385/31 |
| 8,213,755 | B2* | 7/2012 | Mukawa | G02B 27/0172 385/31 |
| 8,396,339 | B2* | 3/2013 | Mukawa | G02B 17/0856 385/31 |
| 9,176,265 | B2* | 11/2015 | Mukawa | G02B 27/0081 |
| 9,279,985 | B2* | 3/2016 | Hiraide | G02B 1/045 |
| 9,335,550 | B2* | 5/2016 | Mukawa | G02B 5/18 |
| 9,541,762 | B2* | 1/2017 | Mukawa | G02B 13/18 |
| 10,018,844 | B2* | 7/2018 | Levola | G02B 6/00 |
| 10,281,727 | B2* | 5/2019 | Hiraide | G02B 1/045 |
| 2006/0228073 | A1 | 10/2006 | Mukawa | G02B 17/0856 385/31 |
| 2008/0239424 | A1* | 10/2008 | Mukawa | G02B 27/144 359/15 |
| 2010/0157433 | A1 | 6/2010 | Mukawa et al. | |
| 2010/0220295 | A1* | 9/2010 | Mukawa | G02B 5/1842 353/20 |
| 2011/0211239 | A1* | 9/2011 | Mukawa | G02B 5/18 359/15 |
| 2012/0081789 | A1* | 4/2012 | Mukawa | G02B 17/004 359/567 |
| 2012/0206811 | A1* | 8/2012 | Mukawa | G02B 6/0026 359/567 |
| 2013/0155513 | A1* | 6/2013 | Mukawa | G02B 17/004 359/567 |
| 2014/0232619 | A1 | 8/2014 | Hiraide | |
| 2015/0355467 | A1* | 12/2015 | Mukawa | G02B 6/005 385/37 |
| 2016/0170215 | A1* | 6/2016 | Mukawa | G02B 27/017 359/13 |
| 2016/0187660 | A1* | 6/2016 | Hiraide | G02B 27/0172 359/630 |
| 2020/0018968 | A1* | 1/2020 | Edwin | G02B 6/0015 |

FOREIGN PATENT DOCUMENTS

| | | |
|---|---|---|
| JP | 2010-145859 A | 7/2010 |
| JP | 2014-160112 A | 9/2014 |
| JP | 2016-213638 A | 12/2016 |

* cited by examiner

HEAD-MOUNTED DISPLAY WITH LIMITED HORIZONTAL ROTATION

CROSS REFERENCE TO RELATED APPLICATIONS

This application is a U.S. National Phase of International Patent Application No. PCT/JP2018/018235 filed on May 11, 2018, which claims priority benefit of Japanese Patent Application No. JP 2017-150508 filed in the Japan Patent Office on Aug. 3, 2017. Each of the above-referenced applications is hereby incorporated herein by reference in its entirety.

FIELD

The present disclosure relates to a head-mounted display.

BACKGROUND

In recent years, head-mounted displays have been known that use a virtual image optical system to allow a viewer (user) to view a two-dimensional image formed by an image generating device as a magnified virtual image.

Patent Literatures 1 and 2 each disclose a structure of a binocular head-mounted display in which two right and left optical modules are connected by a connection member, and the connection member is mounted at a central part of a front part of a frame located between right and left pupils of the viewer. Patent Literature 3 discloses a structure of a binocular head-mounted display in which an image display device including two right and left optical modules connected by an optical plate is mounted by a connection member at a central part of a front part of a frame located between right and left pupils of a viewer.

With the structures disclosed in Patent Literatures 1 to 3, in a case where temples spread outward to deform the frame when the user wears the frame on the head, the deformation can be restrained from reaching the optical modules. Accordingly, a change in right-left angle of convergence can be reduced.

CITATION LIST

Patent Literature

Patent Literature 1: JP 4674634 B
Patent Literature 2: JP 4858512 B
Patent Literature 3: JP 5678460 B

SUMMARY

Technical Problem

In each of the head-mounted displays described in Patent Literatures 1 to 3, however, the image display device including the two right and left optical modules are connected by the connection member to the frame at only a central part of the front part of the frame. This structure may concentrate an external force applied to the image display device on the connection member. For example, if the frame is caught on the face of the user who tries to remove the head-mounted display from the face by holding either one of the right or left optical module, only the optical module moves, and a rotating force is generated about a connection position of the connection by the connection member as viewed from above the head. This force may be concentrated on the connection member to deform or break the connection member. A relatively smaller force can be considered to deform or break the connection member as the user holds the optical module at a location farther from the connection position of the connection by the connection member.

Accordingly, the present disclosure proposes a novel and improved head-mounted display capable of restraining deformation or breakage of a connection member caused by concentration of an external force on the connection member.

Solution to Problem

According to the present disclosure, a head-mounted display s provided that includes: a frame configured to be worn on the head of a viewer, and having a front part to be disposed in front of the viewer; and an image display device connected to a central part of the front part, the image display device comprising: two right and left optical modules each comprising an image generation device and a light guide member that is connected to the image generation device and is disposed closer as a whole to a center of the face of the viewer than the image generation device; and a connection member connecting the image display device to the front part, wherein a part of the image display device is disposed so as to face a part of the front part in a front-rear direction with a predetermined gap interposed therebetween.

Advantageous Effects of Invention

As described above, the present disclosure can provide a head-mounted display capable of restraining deformation or breakage of a connection member caused by concentration of an external force on the connection member.

The advantageous effect described above is not necessarily limitative. Any effects described in the present specification or any other effects understandable from the present specification may be provided in addition to or instead of the above-described effect.

DESCRIPTION OF EMBODIMENTS

Figure 1:
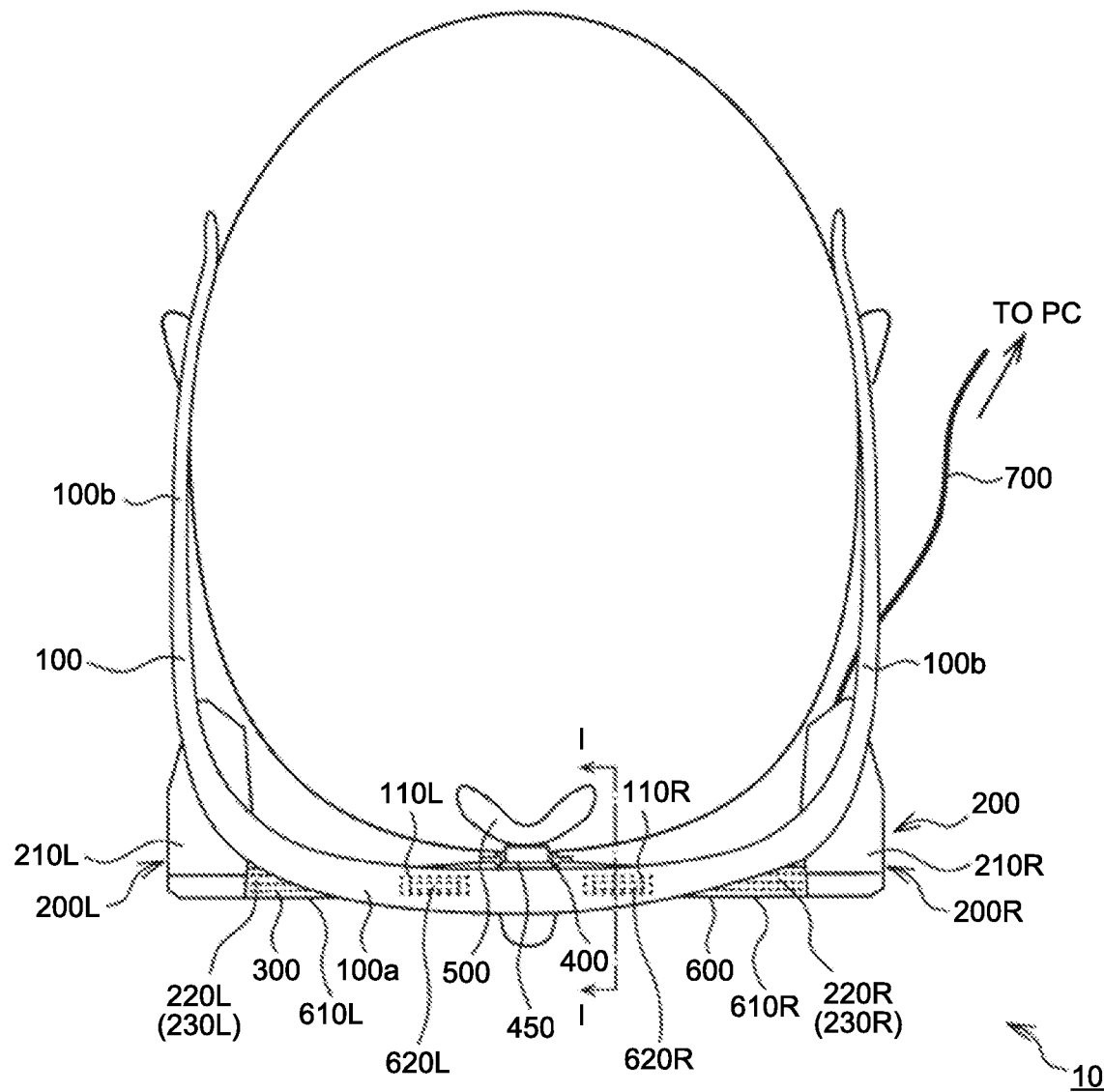
FIG. 1 is a plan view of a head-mounted display according to a first embodiment of the present disclosure.

The following describes preferred embodiments of the present disclosure in detail with reference to the accompanying drawings. In the present specification and the drawings, components having substantially the same functional configurations are denoted by the same reference numerals, and accordingly, description thereof will not be repeated.

The description will be made in the following order.

1. First Embodiment 1.1. Overall configuration example of head-mounted display 1.2. Basic configuration example and operation of optical modules 1.3. Rotation limiting structure 1.4. Modifications 2. Second Embodiment In the present specification, the term "front-rear direction" refers to a direction along a direction in which the face of a viewer faces the front. When terms "front" and "back" are used, the term "front" refers to the front side of the front-rear direction, and the term "back" refers to the rear side of the front-rear direction.

1. First Embodiment

<1.1. Overall Configuration Example of Head-Mounted Display>

Figure 2:
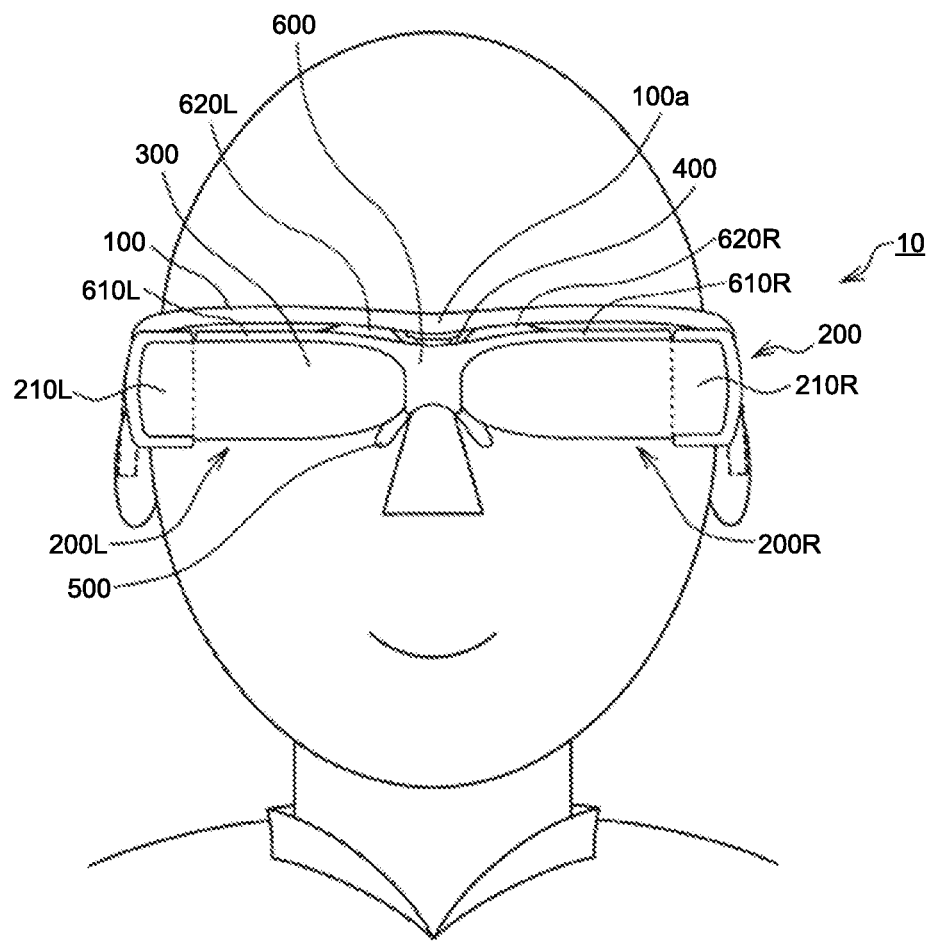
FIG. 2 is a front view of the head-mounted display according to the first embodiment.

First, an overall configuration example of a head-mounted display 10 according to a first embodiment of the present disclosure will be described with reference to FIGS. 1 and 2. FIG. 1 is a plan view of the head-mounted display 10, and FIG. 2 is a front view of the head-mounted display 10. The head-mounted display 10 according to the present embodiment includes a frame 100 and an image display device 200.

The frame 100 is an eyeglass-type frame to be worn on the head of the user. The frame 100 includes a front part 100a to be disposed in front of the user and two temples 100b continuously provided from both right and left ends of the front part 100a. The frame 100 according to the present embodiment may have substantially the same structure as that of a frame of ordinary eyeglasses, except in having no rim. The material constituting the frame 100 may be made of the same material as that of the frame of the ordinary eyeglasses, such as a metal, an alloy, a plastic, or a combination thereof.

In the present embodiment, the frame 100 has a configuration in which the front part 100a and the temples 100b are continuously integrated. The frame 100 may, however, have a configuration in which the front part 100a and the temples 100b are foldable on each other about hinges serving as pivots.

The image display device 200 includes two right and left optical modules 200L and 200R, an optical plate 300, a reinforcement member 600, a connection member 400, and a nose pad 500.

The two right and left optical modules 200L and 200R generate virtual images for the right eye and the left eye, and emit light toward the respective eyes. The optical module 200L includes an image generation device 210L and a light guide unit 230L including a light guide plate 220L. The image generation device 210L is bonded to the light guide plate 220L using, for example, an adhesive such that the image generation device 210L is not displaced with respect to the light guide plate 220L. The light guide unit 230L is disposed closer to the center of the face of the user than the image generation device 210L.

In the same way, the optical module 200R also includes an image generation device 210R and a light guide unit 230R including a light guide plate 220R. The image generation device 210R is bonded to the light guide plate 220R using, for example, an adhesive such that the image generation device 210R is not displaced with respect to the light guide plate 220R. The light guide unit 230R is disposed closer to the center of the face of the user than the image generation device 210R. In this way, the image generation devices 210L and 210R are connected one-to-one to the light guide plates 220L and 220R that are disposed closer as a whole to the center of the face of the user than the image generation devices 210L and 210R.

The light guide units 230L and 230R receive light output from the image generation devices 210L and 210R into the light guide plates 220L and 220R, and guide the light by repeating total reflection of the light in the light guide plates 220L and 220R, respectively, to emit the light toward the pupils of the user. The specific configuration and operation of the optical modules 200L and 200R including the light guide units 230L and 230R will be described later.

The optical plate 300 connects the two right and left optical modules 200L and 200R together. The optical plate 300 is a flat transparent glass plate made of, for example, tempered glass. In the present embodiment, the optical plate 300 is a flat plate, but need not be a flat plate as long as the light guide plates 220L and 220R can be mounted thereon.

Specifically, a back surface of the optical plate 300 is bonded to front surfaces of the two light guide plates 220L and 220R at peripheral parts of the respective light guide plates 220L and 220R, using, for example, an adhesive (not illustrated) containing bead spacers having a diameter of approximately 30 μm. As a result, the two light guide plates 220L and 220R are bonded to the optical plate 300 while a fine air layer is formed between the optical plate 300 and each of the light guide plates 220L and 220R, and thus, the two optical modules 200L and 200R are bonded. In the present embodiment, the air layer is formed between each of the light guide plates 220L and 220R and the optical plate 300 because the front surfaces of the two light guide plates 220L and 220R need to act as internal total reflection surfaces.

Cover glass for protecting the light guide plates 220L and 220R may also be provided on the opposite side of the optical plate 300 with the light guide plates 220L and 220R interposed therebetween, that is, on back surfaces of the light guide plates 220L and 220R.

The connection member 400 connects the image display device 200 to the front part 100a of the frame 100. The connection member 400 is bonded to a surface of the optical plate 300 facing the face of the user at a central part of the optical plate 300. Specifically, the connection member 400 includes a metal plate serving as a reinforcement material, an adhesion layer, and a frame mounting member 450. The metal plate and the frame mounting member 450 are provided as an integrated stay, and are bonded to the central part of the optical plate 300 by the adhesion layer. The nose pad 500 is mounted on the connection member 400.

The connection member 400 is mounted on a central part of the front part 100*a* (corresponding to a bridge part of the ordinary eyeglasses) located between the two pupils of the user, using, for example, screws. This configuration connects the image display device 200 to only the central part of the front part 100*a*. The connection member 400 has both functions of reinforcing the central part of the optical plate 300 and increasing the stiffness of the optical plate 300.

A central part of the reinforcement member 600 is bonded to a surface of the optical plate 300 facing a direction opposite to the face of the user at the central part of the optical plate 300. In other words, the central part of the reinforcement member 600 is bonded to a backside of a surface of the optical plate 300 bonded to the connection member 400. The reinforcement member 600 is bonded to the central part of the optical plate 300 by, for example, an adhesion layer. The reinforcement member 600 includes reinforcement parts 610L and 610R extending rightward and leftward, respectively, from the central part thereof bonded to the optical plate 300, and has a right-left symmetrical shape. The reinforcement parts 610L and 610R have accommodation grooves (not illustrated) in which upper ends of the light guide plates 220L and 220R of the right and left optical modules 200L and 200R, respectively, and the optical plate 300 are disposed.

The reinforcement parts 610L and 610R include limitation ribs 620L and 620R projecting upward from an upper surface thereof. Parts of the limitation ribs 620L and 620R are disposed in limitation grooves 110L and 110R, respectively, provided on a lower surface of the front part 100*a* of the frame 100 (refer to FIG. 1). In the present embodiment, each of the limitation ribs 620L and 620R of the reinforcement member 600 and corresponding one of the limitation grooves 110L and 110R of the front part 100*a* provide a rotation limiting structure of the image display device 200. The rotation limiting structure will be described later in detail.

Wiring 700 connected to, for example, a personal computer (PC) extends from the image generation device 210R, which is one of the two image generation devices 210L and 210R, and image data is transmitted from the PC to the image generation device 210R (refer to FIG. 1). The image generation device 210R as one of the two is connected to the image generation device 210L as the other of the two, for example, via a flexible wiring substrate (not illustrated) laid on an upper surface of the optical plate 300, so that the image data is also transmitted from the PC to the image generation device 210L. The wiring 700 may be connected to the image generation device 210L. The wiring may be connected to the two image generation devices 210L and 210R. The PC may wirelessly communicate the data with the two image generation devices 210L and 210R.

Figure 3:
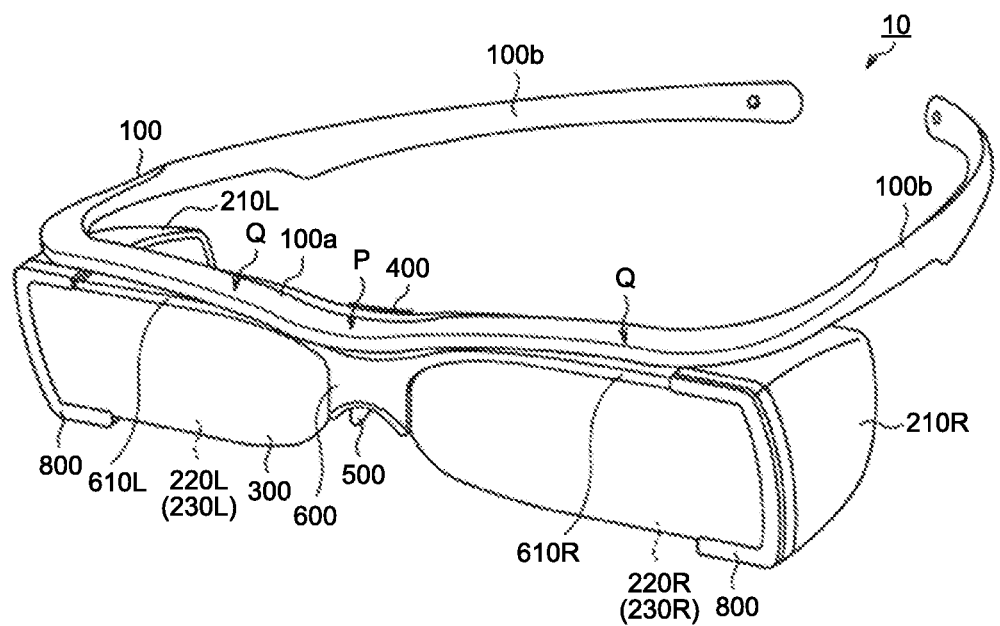
FIG. 3 is a front perspective view of the head-mounted display according to the first embodiment.
Figure 4:
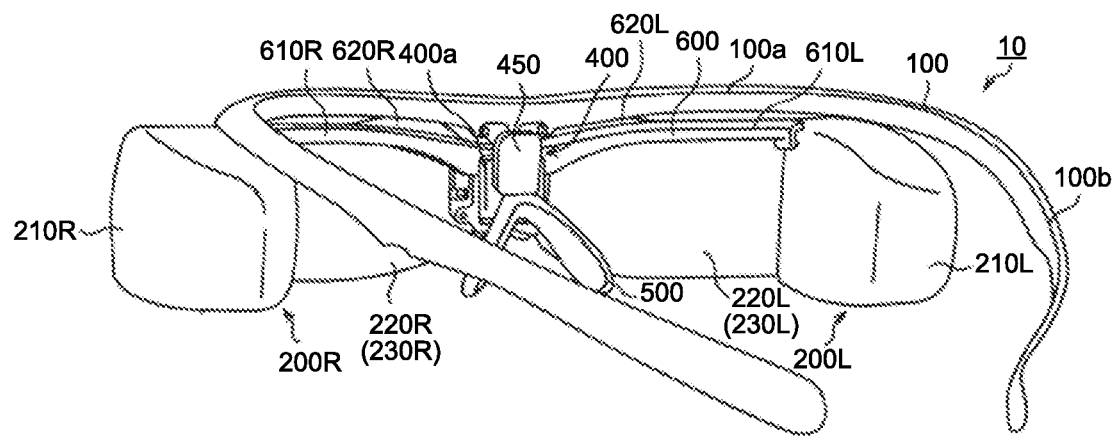
FIG. 4 is a rear perspective view of the head-mounted display according to the first embodiment.

The eyeglass-type head-mounted display 10 according to the present embodiment has a structure in which the optical plate 300 connects together and supports the two right and left optical modules 200L and 200R. The following describes the configuration of supporting the optical modules 200L and 200R in the head-mounted display 10 in more detail with reference to FIGS. 3 and 4. FIG. 3 is a perspective view obtained by viewing the head-mounted display 10 according to the present embodiment from the front side (front). FIG. 4 is a perspective view obtained by viewing the head-mounted display 10 according to the present embodiment from the backside (rear).

In FIGS. 3 and 4, the optical plate 300 and the light guide plates 220L and 220R are integrated to form an eyeglass part. Since the head-mounted display 10 has a recess corresponding to a location of the nose of the user, the optical plate 300 is easily deformed and has a lower fracture strength near the recess. Therefore, the connection member 400 is bonded to the back surface of the central part of the optical plate 300, and the central part of the reinforcement member 600 is bonded to a front surface of the central part of the optical plate 300. This configuration reinforces a central part of the head-mounted display 10.

As described above, the connection member 400 reinforces the optical plate 300 on the back surface of the central part of the optical plate 300. Specifically, the connection member 400 includes a rectangular metal plate 400*a* as the reinforcement material, and the metal plate 400*a* is bonded to the central part of the optical plate 300 by the adhesion layer. The connection member 400 can have any shape, and may have, for example, a rod shape or an elongated plate shape. The material of the connection member 400 is preferably plastic, fiberglass, carbon, or metal, such as aluminum, magnesium, stainless steel, and titanium, or an alloy thereof, or a combination of these materials. The connection member 400 is mounted on the front part 100*a* of the frame 100 with the frame mounting member 450 interposed therebetween.

The reinforcement member 600 reinforces the optical plate 300 on the front surface and at the upper end of the central part of the optical plate 300. Specifically, the central part of the reinforcement member 600 is bonded to the central part of the optical plate 300 by the adhesion layer. The reinforcement member 600 has the accommodation grooves (not illustrated) provided on the reinforcement parts 610L and 610R extending rightward and leftward, respectively, from the central part of the reinforcement member 600, and the upper ends of the optical plate 300 and the light guide plates 220L and 220R are disposed in the accommodation grooves. The material of the reinforcement member 600 is preferably plastic, fiberglass, carbon, or metal, such as aluminum, magnesium, stainless steel, and titanium, or an alloy thereof, or a combination of these materials. Both right and left ends of the reinforcement parts 610L and 610R are disposed in accommodation grooves (not illustrated) of the image generation devices 210L and 210R, respectively.

As illustrated in FIG. 3, the optical plate 300 and the light guide plates 220L and 220R are reinforced at outer rims at both ends thereof by rails 800, and are fixed to front sides of the two image generation devices 210L and 210R.

As described above, in the head-mounted display 10 according to the present embodiment, the fracture strength of the optical plate 300 is increased by sticking the metal plate 400*a* of the connection member 400 and the central part of the reinforcement member 600 to the optical plate 300, by disposing the upper ends of the optical plate 300 and the light guide plates 220L and 220R in the accommodation grooves on the reinforcement parts 610L and 610R of the reinforcement member 600, and further, by holding both ends of the optical plate 300 and the light guide plates 220L and 220R using the rails 800.

<1.2. Basic Configuration Example and Operation of Optical Modules>

Figure 5:
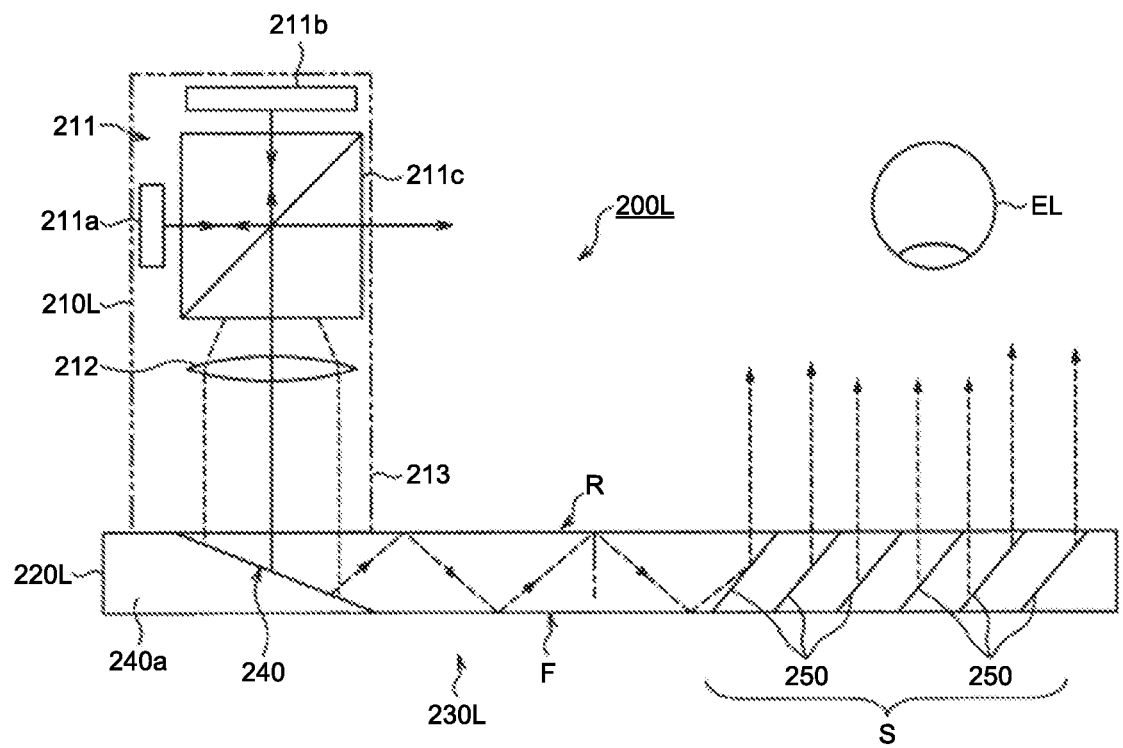
FIG. 5 is a diagram for explaining an optical module of the head-mounted display according to the first embodiment.

The following describes a basic configuration example and an operation of the two optical modules 200L and 200R with reference to FIG. 5. FIG. 5 is a conceptual diagram of the optical module 200L as one of the two optical modules 200L and 200R. The optical module 200R is provided right-left symmetrically to the optical module 200L, and is structurally the same as the optical module 200L, so that no description of the optical module 200R will be given herein.

The optical module 200L includes the image generation device 210L and the light guide unit 230L. The image generation device 210L includes an image forming unit 211 and a collimating optical system 212. The image forming unit 211 and the collimating optical system 212 are housed in a housing 213 (indicated by a dash-dot line). The housing 213 is provided with an opening (not illustrated), and light is emitted from the collimating optical system 212 through the opening. The housing 213 is bonded to the light guide unit 230L.

The image forming unit 211 includes a plurality of pixels arranged in a two-dimensional matrix. The collimating optical system 212 functions so as to collimate light emitted from the pixels of the image forming unit 211 into a parallel light beam. The light having been collimated into the parallel light beam by the collimating optical system 212 enters the light guide plate 220L, and is guided therein and emitted therefrom.

The image forming unit 211 is constituted by a light source 211a, a liquid crystal display (LCD) 211b, and a polarizing beam splitter 211c. The LCD 211b and the polarizing beam splitter 211c constitute a reflective spatial light modulator. The LCD 211b is constituted by, for example, liquid crystals on silicon (LCOS) serving as light valves. The polarizing beam splitter 211c reflects a part of light emitted from the light source 211a to guide the part of light to the LCD 211b, and transmits a part of the light reflected by the LCD 211b to guide the transmitted light to the collimating optical system 212.

The LCD 211b includes the pixels arranged in the two-dimensional matrix. The polarizing beam splitter 211c may have a known configuration and structure. The non-polarized light emitted from the light source 211a hits the polarizing beam splitter 211c. At that time, a p-polarized component of the light is transmitted through the polarizing beam splitter 211c, and emitted out of the system. In contrast, an s-polarized component of the light is reflected by the polarizing beam splitter 211c, enters the LCD 211b, is reflected in the LCD 211b, and is emitted from the LCD 211b.

Of the light emitted from the LCD 211b, light emitted from pixels displaying "white" contains a larger amount of the p-polarized component, and light emitted from pixels displaying "black" contains a larger amount of the s-polarized component. Accordingly, of the light emitted from the LCD 211b and hitting the polarizing beam splitter 211c, the p-polarized component is transmitted through the polarizing beam splitter 211c, and guided to the collimating optical system 212. In contrast, the s-polarized component is reflected at the polarizing beam splitter 211c, and travels back to the light source 211a.

The LCD 211b includes, for example, 320×240 pixels (the number of liquid crystal cells is, for example, three times the number of the pixels) arranged in the two-dimensional matrix. For example, the collimating optical system 212 is constituted by, for example, a convex lens, and the LCD 211b is disposed in a position of a focal length point in the collimating optical system 212 in order to generate the parallel light beam. Each of the pixels is constituted by a red light-emitting sub-pixel that emits a red color, a green light-emitting sub-pixel that emits a green color, and a blue light-emitting sub-pixel that emits a blue color.

The light guide unit 230L includes the light guide plate 220L, a first deflection unit 240, and a second deflection unit 250. The light having entered the light guide unit 230L propagates while being totally reflected in the light guide plate 220, and is emitted therefrom.

The first deflection unit 240 reflects the light having entered the light guide plate 220L so as to totally reflect the light having entered the light guide plate 220L in the light guide plate 220L. The first deflection unit 240 can be constituted by a light-reflecting film (a type of mirror) that is made of, for example, a metal containing aluminum or an alloy thereof, and reflects the light having entered the light guide plate 220L, or by a diffraction grating (such as a holographic diffraction grating film) that diffracts the light having entered the light guide plate 220L.

The second deflection unit 250 is configured to transmit and reflect the light propagated while the light is totally reflected in the light guide plate 220L a plurality of times. The second deflection unit 250 is constituted by, for example, a light-reflecting multilayer film having a multilayer laminated structure, and emits the light from the light guide plate 220L as a plurality of light beams. In such a configuration, the entrance side has therein a mirror, and the exit side has half-mirror films, the first deflection unit 240 serving as a reflecting mirror, and the second deflection unit 250 serving as a semi-transparent mirror.

The second deflection unit 250 can be constituted by a multilayer structure laminated with multiple dielectric stacked films, a half-mirror, a polarizing beam splitter, or holographic diffraction grating films. The dielectric stacked films are formed of, for example, $TiO_2$ films serving as a high-dielectric constant material and $SiO_2$ films serving as a low-dielectric constant material. Japanese Translation of PCT International Application Publication No. 2005-521099 discloses the multilayer structure laminated with the multiple dielectric stacked films. Although FIG. 5 illustrates the dielectric stacked films having six layers, the present disclosure is not limited thereto. A thin piece made of the same material as that of the light guide plate 220L is interposed between one of the dielectric stacked films and another of the dielectric stacked films.

At the first deflection unit 240, the parallel light beam having entered the light guide plate 220L is reflected (or diffracted) so as to be totally reflected in the light guide plate 220L. In contrast, at the second deflection unit 250, the parallel light beam having propagated through the total reflection in the light guide plate 220L is reflected (or diffracted) a plurality of times to be emitted from the light guide plate 220L in the state of the parallel light beam.

To provide the first deflection unit 240, the following only needs to be performed. An inclined surface for providing the first deflection unit 240 is provided in the light guide plate 220L by cutting out a part 240a of the light guide plate 220L to be provided with the first deflection unit 240, and the light-reflecting film is formed on the inclined surface by vacuum deposition. Thereafter, the cutout part 240a of the light guide plate 220L is bonded to the first deflection unit 240. To provide the second deflection unit 250, the following only needs to be performed. The multilayer structure laminated with the same material (such as glass) as that of the light guide plate 220L and the multiple dielectric stacked films (formable by a vacuum deposition method) is produced, and an inclined surface is formed by cutting out a part S of the light guide plate 220L to be provided with the second deflection unit 250. Then, the multilayer structure is bonded to the inclined surface, polished, and so on, and the outer shape is adjusted. The above-described processes provide the light guide unit 230L in which the light guide plate 220L is provided therein with the first deflection unit 240 and the second deflection unit 250.

The light guide plate 220L has two parallel surfaces (a first surface F and a second surface R) extending parallel to an axis line (Y-direction) of the light guide plate. The first surface F faces the second surface R. When a light guide plate entrance surface denotes a surface of the light guide plate 220L from which the light enters the light guide plate 220L, and a light guide plate exit surface denotes a surface of the light guide plate 220L from which the light exits, the first surface F may constitute the light guide plate entrance surface and the light guide plate exit surface, or the second surface R may constitute the light guide plate entrance surface and the light guide plate exit surface. Herein, the parallel light beam enters the light guide plate 220L from the first surface F corresponding to the light entrance surface, and after propagating in the light guide plate 220L through the total reflection, exits from the second surface R corresponding to the light exit surface.

Examples of a material constituting the light guide plate 220L include glass including optical glass such as fused quartz and BK7, and plastic materials (such as polymethyl methacrylates (PMMAs), polycarbonate resins, acrylic resins, amorphous polypropylene resins, and styrene resins including styrene-acrylonitrile (AS) resins). The shape of the light guide plate 220L is not limited to a flat plate shape, and may be a curved shape.

Based on the above-described configuration, the light guide units 230L and 230R provided in the head-mounted display 10 guide the light emitted from the image generation devices 210L and 210R, respectively, by totally reflecting the light in the light guide plates 220L and 220R, respectively. The optical plate 300 is bonded to a total reflection surface of the light guide plates 220L and 220R. Since the light propagating through the light guide plates 220L and 220R is guided while being totally reflected, the light stops being guided or light paths thereof deviate if the light guide plates 220L and 220R are scarred or stained. Therefore, the optical plate 300 protects the light guide plates 220L and 220R, and prevents the surfaces of the light guide plates 220L and 220R from being scarred or stained so as to ensure the total reflection in the light guide plates 220L and 220R. For the same purpose, the air layer is provided between the optical plate 300 and each of the light guide plates 220L and 220R to further ensure the total reflection of the light by the air layer.

<1.3. Rotation Limiting Structure>

The following describes the rotation limiting structure provided in the head-mounted display 10 according to the present embodiment.

(1.3.1. Need for Rotation Limiting Structure)

Figure 6:
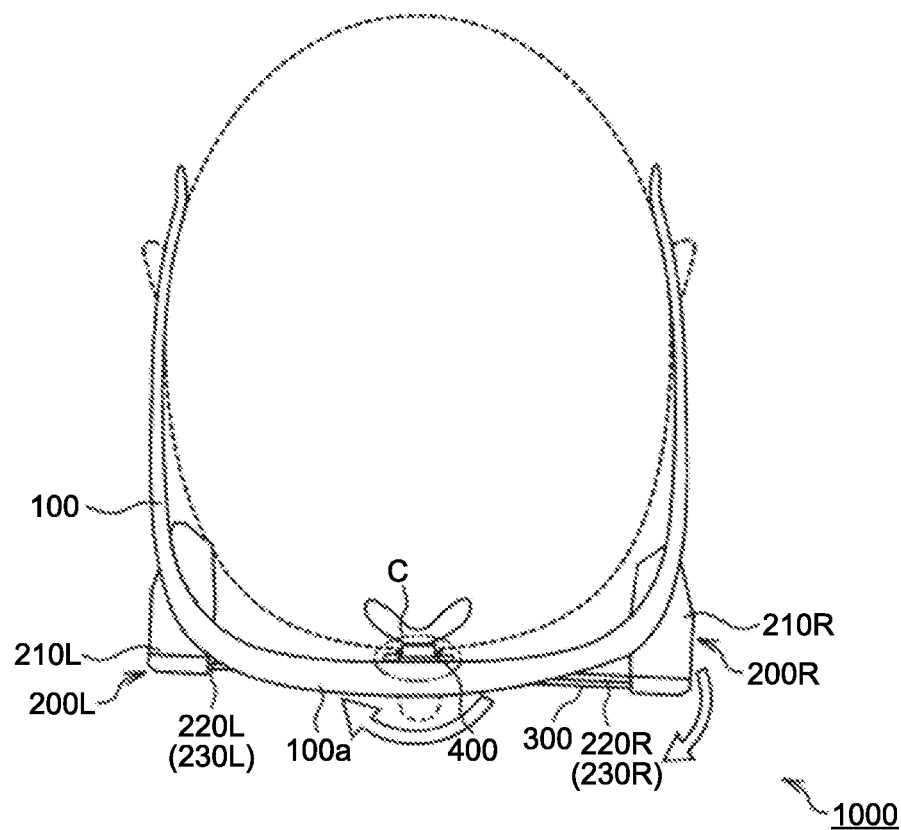
FIG. 6 is an explanatory diagram illustrating a state in which an external force is applied to a conventional head-mounted display.
Figure 7:
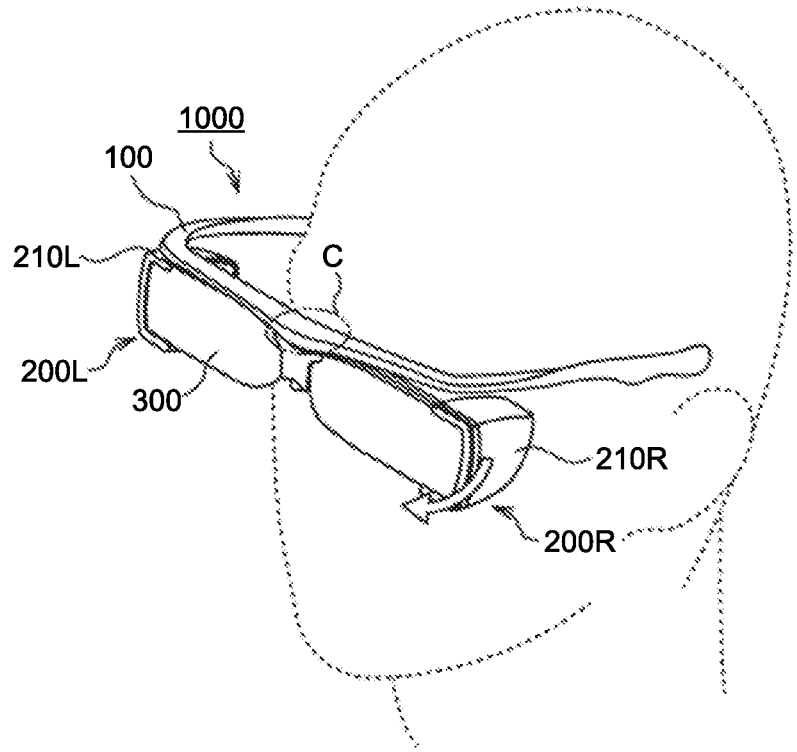
FIG. 7 is another explanatory diagram illustrating the state in which the external force is applied to the conventional head-mounted display.
Figure 8:
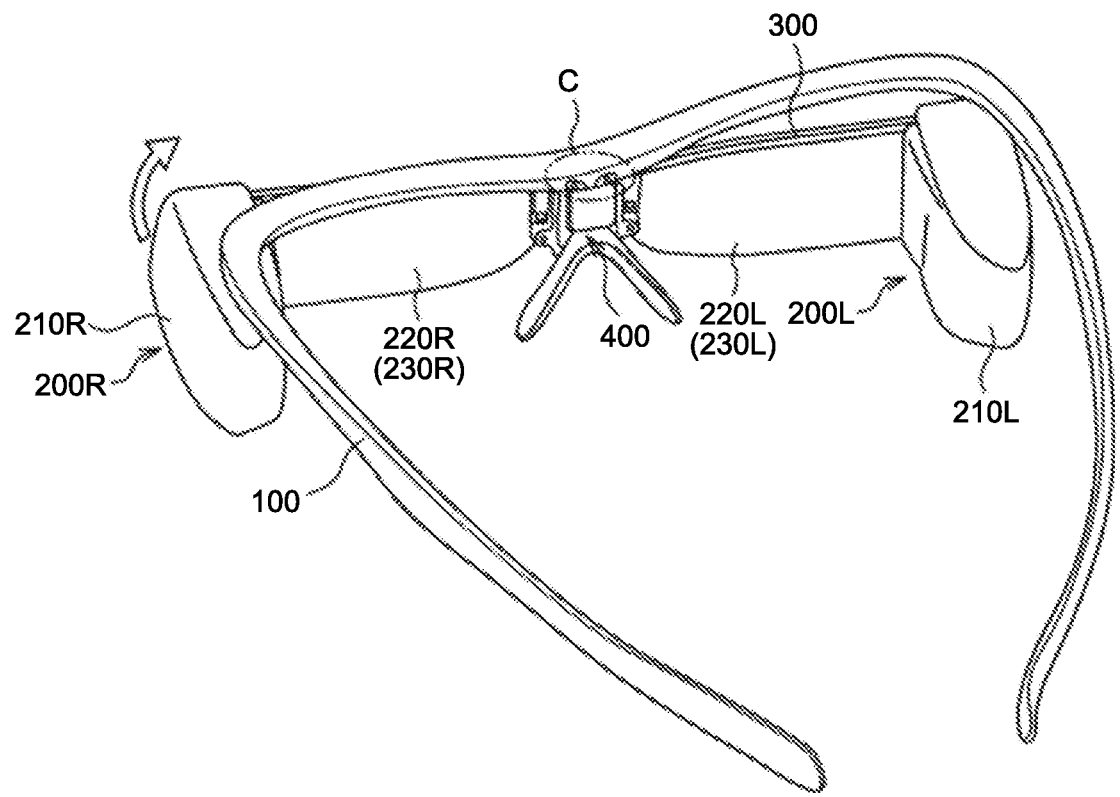
FIG. 8 is still another explanatory diagram illustrating the state in which the external force is applied to the conventional head-mounted display.

First, the need for the rotation limiting structure will be described with reference to FIGS. 6 to 8. FIGS. 6 to 8 are explanatory diagrams illustrating a state in which an external force is applied to a conventional head-mounted display 1000 that does not have the rotation limiting structure. FIG. 6 is a plan view of the conventional head-mounted display 1000. FIG. 7 is a front perspective view of the conventional head-mounted display 1000. FIG. 8 is a rear perspective view of the conventional head-mounted display 1000.

The head-mounted display 1000 illustrated in FIGS. 6 to 8 is an example that has the same configuration as that of the head-mounted display 10 according to the present embodiment except in not including the rotation limiting structure and the reinforcement member. The same members are assigned the same reference numerals.

For example, assume that when the user removes the head-mounted display 1000 from the face, the user holds and moves forward the image generation device 210R of the optical module 200R as one of the optical modules. At this time, if the frame 100 is caught on the face for some reason, only the image display device 200 moves, and a force in a clockwise direction as viewed from above the user is generated about a connection position C of the connection between the image display device 200 and the frame 100 by the connection member 400. This force is concentrated on the connection position C of the connection by the connection member, and may deform or break the connection member 400.

In particular, when the user holds the image generation device 210R and tries to remove the head-mounted display 1000 from the face, the external force is applied to the image display device 200 in a position farthest from the connection position C of the connection by the connection member 400. As a result, even a relatively small force can easily deform or break the connection member 400.

In contrast, the head-mounted display 10 according to the present embodiment is provided with the rotation limiting structure, and the rotation limiting structure limits a rotation of the image display device 200 relative to the frame 100 to restrain the connection member 400 from being deformed or broken.

(1.3.2. Configuration Example of Rotation Limiting Structure)

Figure 9:
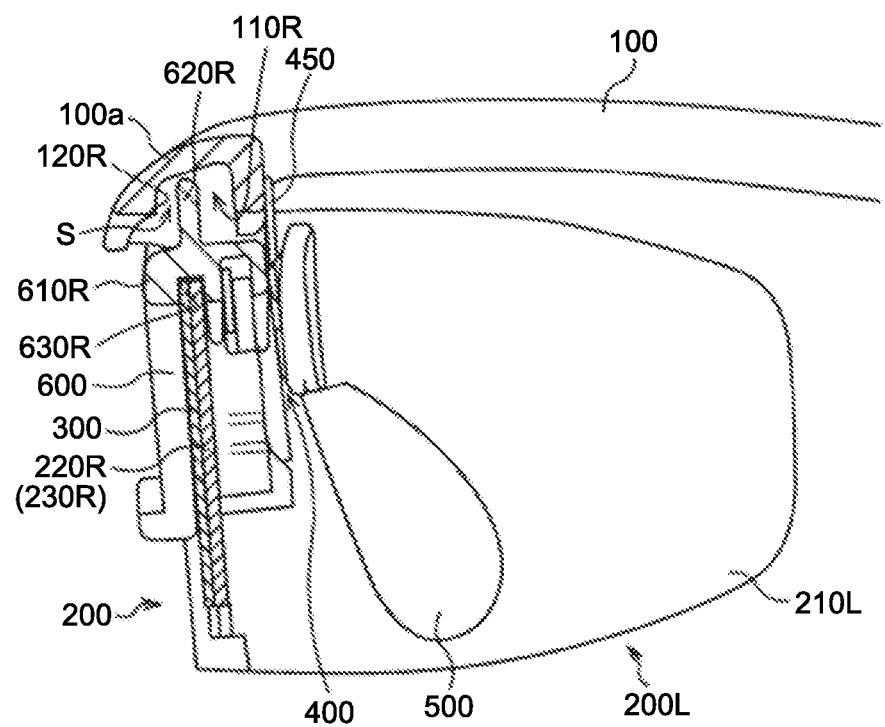
FIG. 9 is a view for explaining a rotation limiting structure of the head-mounted display according to the first embodiment.

FIG. 9 is a view for explaining the rotation limiting structure provided on the optical module 200R side as one of the optical modules, and illustrates a sectional view obtained by viewing section I-I of the head-mounted display 10 illustrated in FIG. 1 in the arrow direction. The rotation limiting structures are symmetrically provided on both the right and left sides of the head-mounted display 10, and since the rotation limiting structure on the optical module 200L side as the other of the optical modules is configured in the same way as the rotation limiting structure illustrated in FIG. 9, no description thereof will be given herein.

As illustrated in FIG. 9, an accommodation groove 630R is formed on a lower surface of the reinforcement part 610R of the reinforcement member 600. The upper ends of the light guide plate 220R of the optical module 200R and the optical plate 300 are disposed in the accommodation groove 630R. The reinforcement part 610R has the limitation rib 620R projecting upward from the upper surface thereof. The lower surface of the front part 100a of the frame 100 is provided with the limitation groove 110R. A part of the limitation rib 620R provided on the reinforcement part 610R of the reinforcement member 600 is disposed in the limitation groove 110R of the front part 100a.

When no external force is applied to the image display device 200, the limitation rib 620R of the reinforcement member 600 and the limitation groove 110R of the front part 100a are disposed so as not to contact each other at least in the front-rear direction. Specifically, the limitation rib 620R is disposed so as to face, in the front-rear direction, at least a side surface 120R facing the face of the user among side surfaces of the limitation groove 110R of the front part 100a, with a predetermined gap S interposed therebetween. The limitation rib 620R of the reinforcement member 600 serving as the image display device 200 and the side surface 120R of the limitation groove 110R serving as a part of the front part 100a constitute the rotation limiting structure that limits a forward rotational movement range of the optical module 200R and the optical plate 300. In other words, in the case of limiting the forward rotational movement range of the optical module 200R and the optical plate 300, the limitation rib 620R serving as the part of the image display device 200 is disposed closer to the face of the user than the side surface 120R of the limitation groove 110R serving as the part of the front part 100a of the frame 100 so as to face the face of the user.

The rotation limiting structure having the same configuration is also provided on the optical module 200L side as the other of the optical modules. In other words, the reinforcement part 610L of the reinforcement member 600 extending toward the optical module 200L has the limitation rib 620L projecting upward from the upper surface thereof. The lower surface of the front part 100a of the frame 100 is provided with the limitation groove 110L, and a part of the limitation rib 620L of the reinforcement member 600 is disposed in the limitation groove 110L. The limitation rib 620L is disposed so as to face, in the front-rear direction, at least a surface facing the face of the user among side surfaces of the limitation groove 110L of the front part 100a, with the predetermined gap S interposed therebetween.

The limitation rib 620L of the reinforcement member 600 serving as a part of the image display device 200 and a side surface 120L of the limitation groove 110L serving as a part of the front part 100a constitute the rotation limiting structure that limits a forward rotational movement range of the optical module 200L and the optical plate 300. In other words, in the case of limiting the forward rotational movement range of the optical module 200L and the optical plate 300, the limitation rib 620L serving as the part of the image display device 200 is disposed closer to the face of the user than the side surface 120L of the limitation groove 110L serving as the part of the front part 100a of the frame 100 so as to face the face of the user.

The limitation ribs 620L and 620R and the limitation grooves 110L and 110R are not particularly limited in shape. The limitation ribs 620L and 620R may have a rod shape or a plate shape, or may have any other appropriate three-dimensional shape. Each of the limitation grooves 110L and 110R may have any appropriate shape as long as the shape allows at least a part of corresponding one of the limitation ribs 620L and 620R to be disposed therein. In this case, the three-dimensional shape of the limitation grooves 110L and 110R or the planar shape thereof as viewed from above the user may be similar to or different from the three-dimensional shape of the limitation ribs 620L and 620R or the planar shape thereof.

Each of the limitation grooves 110L and 110R is not limited to being formed of a recess provided on the lower surface of the front part 100a, and may be formed of a hole vertically penetrating the front part 100a.

The gap S between the limitation rib 620R serving as the part of the image display device 200 and the side surface 120R of the limitation groove 110R serving as the part of the front part 100a of the frame 100 only needs to be formed at least when the head-mounted display 10 is worn. In other words, the gap S only needs to be formed in a state in which the right and left temples 100b of the frame 100 are spread when the head-mounted display 10 is worn.

In the case where the relative rotation between the frame 100 and the image display device 200 is limited, the gap S need not be provided between the limitation rib 620R and the side surface 120R of the limitation groove 110R in the state in which the user wears the head-mounted display 10. However, if the gap S is not provided in the state in which the user wears the head-mounted display 10, an elastic force of the frame 100 always acts on the image display device 200 when the right-left spread of the frame 100 has been eliminated in a state in which the head-mounted display 10 has been removed from the face. Therefore, to prevent the elastic force of the frame 100 from acting on the image display device 200 when the head-mounted display 10 is not worn, the gap S is formed between the limitation rib 620R and the side surface 120R of the limitation groove 110R when the head-mounted display 10 is worn.

Figure 10:
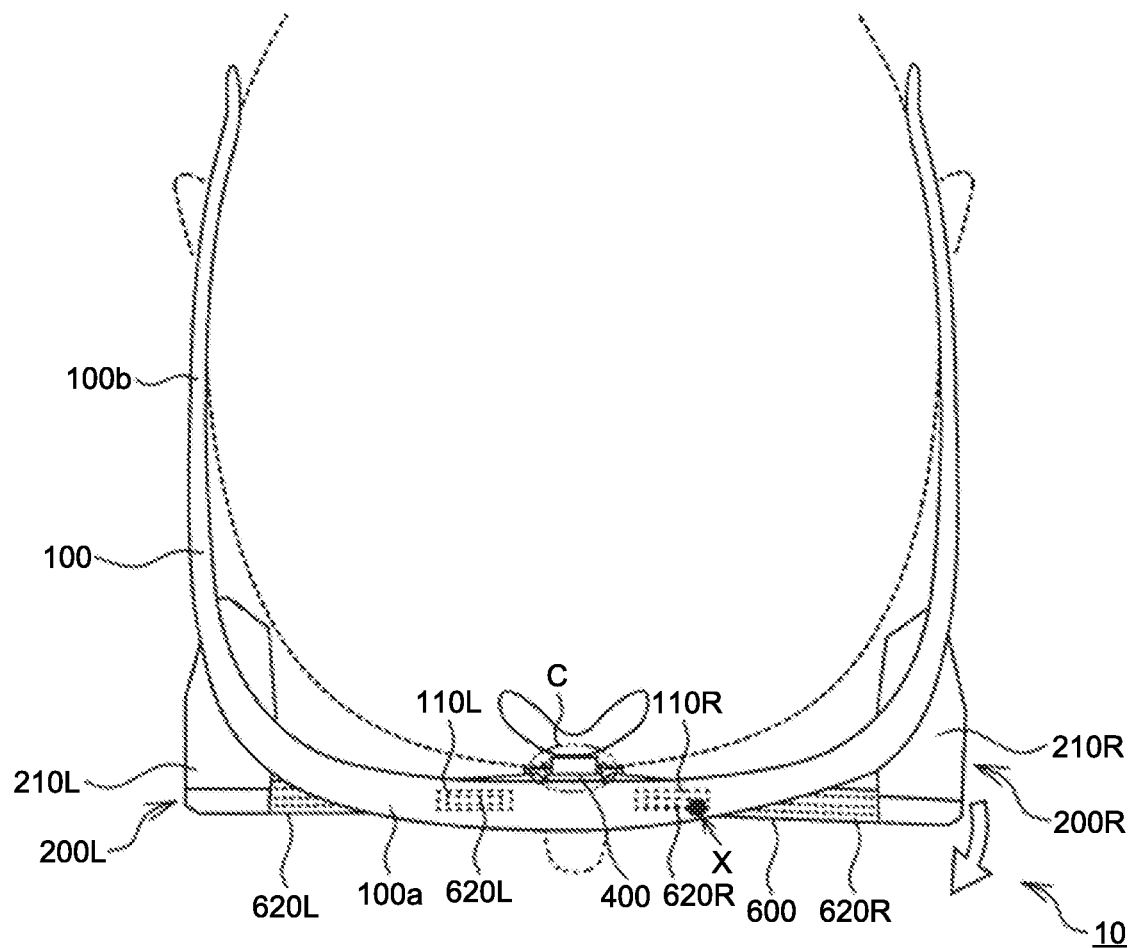
FIG. 10 is a view for explaining an action of the head-mounted display according to the first embodiment.

FIG. 10 illustrates a state in which the user holds and moves forward the image generation device 210R of the optical module 200R as one of the optical modules. When the user holds and moves forward the image generation device 210R, if the frame 100 is caught on the face and only the image display device 200 rotates, the limitation rib 620R provided on the reinforcement part 610R of the reinforcement member 600 contacts the side surface 120R of the limitation groove 110R on the front part 100a of the frame 100 in a contact position X. This contact limits the movement range of the relative rotation of the image display device 200 about the connection position C of the connection between the frame 100 and the image display device 200 by the connection member 400.

(1.3.3. Width of Gap)

Figure 11:
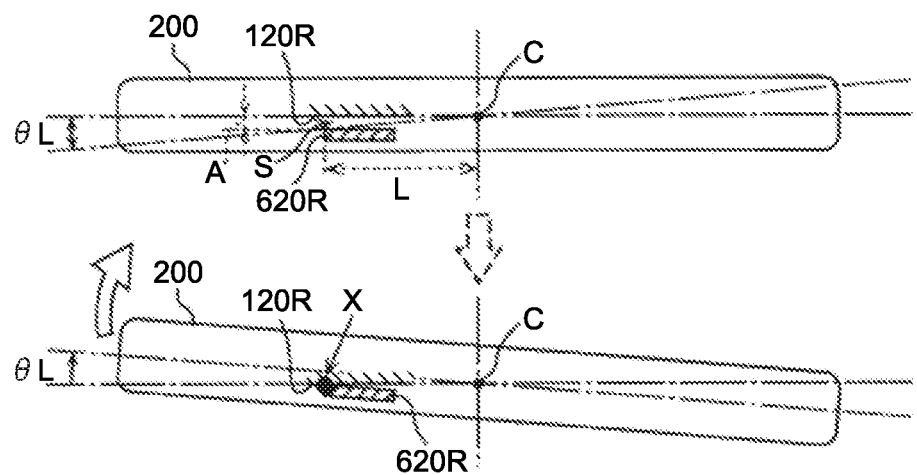
FIG. 11 is a diagram for explaining a width of a gap.

FIG. 11 is a schematic diagram for explaining a width A of the gap S between the limitation rib 620R of the reinforcement member 600 and the side surface 120R of the limitation groove 110R of the frame 100. To restrain the connection member 400 from being deformed or broken by the relative rotation between the frame 100 and the image display device 200 about the connection position C of the connection between the frame 100 and the image display device 200 by the connection member 400, the width A of the gap S desirably satisfies expression (1) below.

$$0 < A \leq L \times \tan \theta_L \quad (1)$$

where

L is distance from the center (C) of the relative rotation between the frame 100 and the image display device 200 to the contact position between the part of the image display device 200 and the part of the front part 100a disposed so as to face each other, and $\theta_L$, is an elastic limit angle of the connection member 400.

In the present embodiment, a distance L corresponds to the distance from the center C of the relative rotation to the contact position X of the limitation rib 620R of the reinforcement member 600 with the side surface 120R of the limitation groove 110R of the front part 100a. Specifically, as illustrated in FIG. 11, if the limitation rib 620R and the side surface 120R of the limitation groove (110R) are arranged in parallel when no external force is applied to the image display device 200, the contact position X of contact of the limitation rib 620R with the side surface 120R of the limitation groove (110R) caused by the relative rotation between the frame 100 and the image display device 200 is located in a position at an end of the limitation rib 620R located on a side thereof opposite to the center (C) of the relative rotation. Accordingly, the distance from the end to the center (C) of the relative rotation corresponds to the distance L in expression (1).

The elastic limit angle $\theta_L$ of the connection member 400 is an allowable angle up to which the frame 100 and the image display device 200 are relatively rotatable without deforming or breaking the connection member 400, and is an angle set taking into account a factor of safety determined based on the material cost and design conditions of the connection member 400.

When the width A of the gap S between the limitation rib 620R of the reinforcement member 600 and the side surface 120R of the limitation groove 110R of the frame 100 satisfies expression (1) above, the effect of restraining the deformation or the breakage of the connection member 400 can be improved when the frame 100 and the image display device 200 relatively rotate about the connection position C of the connection by the connection member 400.

(1.3.4. Contact Position)

No particular limitation is placed on the position of each of the contact positions X of the limitation ribs 620L and 620R serving as the parts of the image display device 200 with the side surfaces 120L and 120R of the limitation grooves 110L and 110R serving as the parts of the front part 100a of the frame 100 on both the right and left sides of the head-mounted display 10.

For example, the limitation ribs 620L and 620R on both the right and left sides of the head-mounted display 10 may contact the side surfaces 120L and 120R of the limitation grooves 110L and 110R in positions closer to the connection positions C of the connection by the connection member 400 than to the image generation devices 210L and 210R. As the contact positions X are closer to the connection position C, distances of rotational movement of the limitation ribs 620L and 620R can be smaller until the limitation ribs 620L and 620R contact the side surfaces 120L and 120R of the limitation grooves 110L and 110R. In other words, since the above-described width A of the gap S can be reduced, the limitation grooves 110L and 110R need not increase in size, so that the frame 100 can be restrained from increasing in size. As the contact positions X are closer to the connection position C, the limitation ribs 620L and 620R can be less likely to be dislocated out of the limitation grooves 110L and 110R by, for example, a deflection of the frame 100.

The limitation ribs 620L and 620R on both the right and left sides of the head-mounted display 10 may contact the side surfaces 120L and 120R of the limitation grooves 110L and 110R in positions closer to the image generation devices 210L and 210R than to the connection positions C of the connection by the connection member 400. As the contact positions X are closer to the image generation devices 210L and 210R, a design tolerance can have a smaller influence on setting of the above-described width A of the gap S.

The above has described the head-mounted display 10 according to the first embodiment. In the head-mounted display 10 according to the present embodiment, the reinforcement parts 610L and 610R on both the right and left sides of the reinforcement member 600 of the image display device 200 are provided with the limitation ribs 620L and 620R. The limitation ribs 620L and 620R are disposed so as to face, in the front-rear direction, the side surfaces 120L and 120R of the limitation grooves 110L and 110R provided on the front part 100a of the frame 100, with the predetermined gaps S interposed therebetween. The limitation ribs 620L and 620R on the image display device 200 side are disposed closer to the face of the user (viewer) than the side surfaces 120L and 120R of the limitation grooves 110L and 110R on the frame 100 side.

Accordingly, even if the frame 100 is caught on the face when the user holds a part of the image display device 200 and removes the head-mounted display 10 from the face, the movement range of the rotation of the image display device 200 is limited relative to the frame 100. This configuration can reduce the external force that acts on the connection position C of the connection between the frame 100 and the image display device 200 by the connection member 400, and thus restrain the connection member 400 from being deformed or broken.

The head-mounted display 10 according to the present embodiment need not be greatly changed in configuration from the conventional head-mounted display, except that the reinforcement member 600 is provided with the limitation ribs 620L and 620R, and the front part 100a of the frame 100 is provided with the limitation grooves 110L and 110R. Accordingly, the fracture strength of the connection member 400 can be improved without affecting the angle of convergence of the head-mounted display 10.

Since the rotation limiting structures of the head-mounted display 10 according to the present embodiment have the relatively simple configuration using the limitation ribs 620L and 620R, the fracture strength of the connection member 400 can be improved without incurring any significant increase in weight and manufacturing cost.

<1.4. Modifications>

While the above has described the head-mounted display 10 according to the first embodiment of the present disclosure, the rotation limiting structure of the head-mounted display 10 according to the present embodiment can be variously modified. The following describes several modifications of the rotation limiting structure.

(1.4.1. First Modification)

Figure 12:
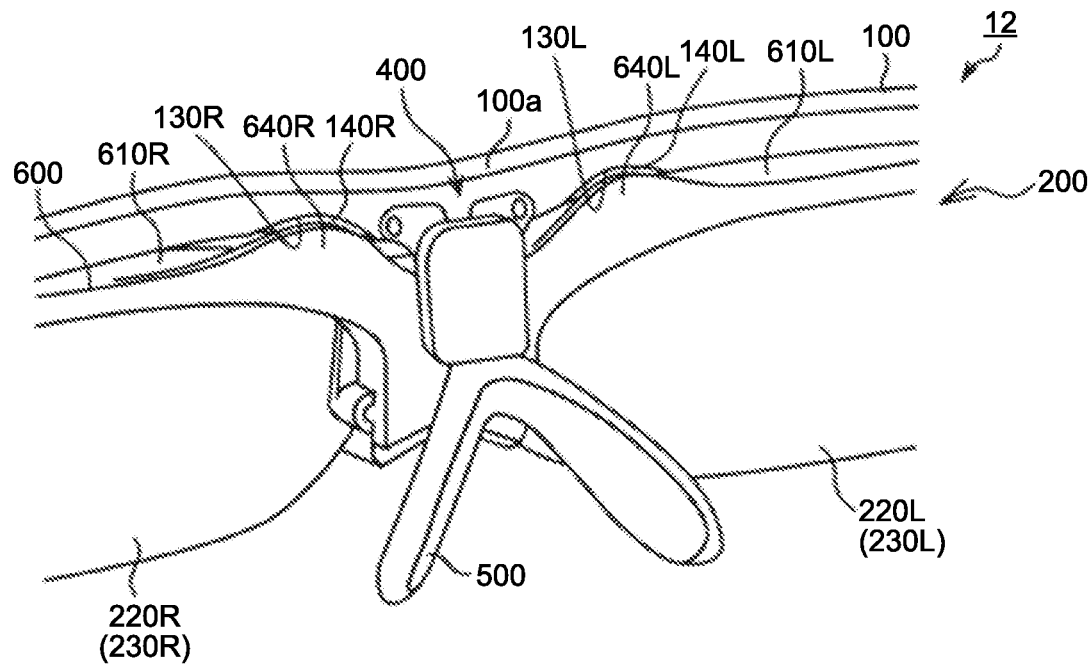
FIG. 12 is a view for explaining a first modification.

FIG. 12 is a view for explaining a first modification. FIG. 12 illustrates a perspective view of a right-left central part of a head-mounted display 12 according to the first modification as viewed from the backside (rear).

In the first modification, the frame 100 has recesses 130L and 130R on a surface of the front part 100a facing the face of the user. The recesses 130L and 130R are open toward the face of the user and downward. The reinforcement parts 610L and 610R of the reinforcement member 600 has limitation ribs 640L and 640R projecting upward from the upper surfaces thereof. The limitation ribs 640L and 640R are provided in positions of the reinforcement parts 610L and 610R closest to the face of the user.

In the first modification, the limitation ribs 640L and 640R serving as parts of the image display device 200 are disposed so as to face side surfaces 140L and 140R of the recesses 130L and 130R serving as parts of the front part 100a of the frame 100, with predetermined gaps interposed therebetween. Also in the first modification, the limitation ribs 640L and 640R serving as the parts of the image display device 200 are disposed closer to the face of the user than the side surfaces 140L and 140R of the recesses 130L and 130R serving as the parts of the front part 100a so as to face the face of the user. This configuration limits the movement range of the relative rotation of the image display device 200 about the connection position of the connection between the image display device 200 and the frame 100 by the connection member 400, and can restrain the connection member 400 from being deformed or broken when the frame 100 and the image display device 200 relatively rotate.

The limitation ribs 640L and 640R and the recesses 130L and 130R are not particularly limited in shape. When the head-mounted display 12 is viewed from the rear, the planar shape of the recesses 130L and 130R may be similar to or different from the planar shape of the limitation ribs 640L and 640R. The configuration of the rotation limiting structure of the above-described embodiment can be employed as appropriate as a configuration other than that described above, including, for example, the width of the gap between each of the limitation ribs 640L and 640R and corresponding one of the side surfaces 140L and 140R of the recesses 130L and 130R, and the contact position of each of the limitation ribs 640L and 640R with corresponding one of the side surfaces 140L and 140R of the recesses 130L and 130R.

In the first modification, the recesses 130L and 130R of the front part 100a of the frame 100 may be omitted. In other words, each of the limitation ribs 620L and 620R provided on the reinforcement parts 610L and 610R of the reinforcement member 600 may be disposed so as to face an appropriate part of the front part 100a with a predetermined gap interposed therebetween.

(1.4.2. Second Modification)

Figure 13:
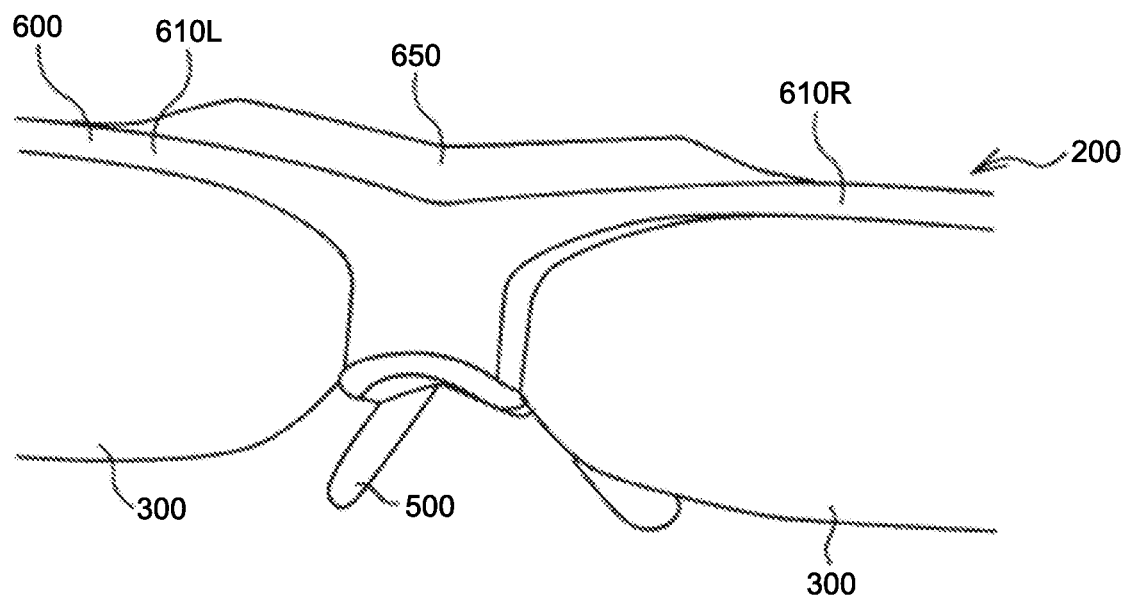
FIG. 13 is a view for explaining a second modification.

FIG. 13 is a view for explaining a second modification. FIG. 13 illustrates a perspective view of a right-left central part of the image display device 200 as viewed from the front side (front).

As illustrated in FIG. 13, in the second modification, a limitation rib 650 provided on the reinforcement member 600 of the image display device 200 is formed in one body across both right and left sides thereof. The limitation rib 650 is not particularly limited in shape. In this case, the front part 100a of the frame 100 (not illustrated) may be provided with a limitation groove formed of a recess provided on the lower surface thereof or a hole vertically penetrating the front part 100a, in the same way as the limitation grooves (110L and 110R) in the case of the embodiment described above. Alternatively, the front part 100a of the frame 100 (not illustrated) may be provided, on a surface thereof facing the face of the user, with a recess formed across both right and left sides thereof, in the same way as the recesses (130L and 130R) in the case of the first modification described above.

In the second modification, the limitation rib 650 serving as a part of the image display device 200 is disposed so as to face a side surface of the limitation groove or the recess (not illustrated) serving as a part of the front part 100a of the frame 100, with a predetermined gap interposed therebetween. Also in the second modification, the limitation rib 650 serving as the part of the image display device 200 is disposed closer to the face of the user than the side surface of the limitation groove or the recess serving as the part of the front part 100a so as to face the face of the user. This configuration limits the movement range of the relative rotation of the image display device 200 about the connection position of the connection between the image display device 200 and the frame 100 by the connection member 400, and can restrain the connection member 400 from being deformed or broken when the frame 100 and the image display device 200 relatively rotate.

The configuration of the rotation limiting structure of the above-described embodiment or the first modification can be employed as appropriate as a configuration other than that described above, including, for example, the width of the gap between the limitation rib 650 and the side surface of the limitation groove or the recess of the front part 100a of the frame 100, and the contact position of the limitation rib 650 with the side surface of the limitation groove or the recess.

(1.4.3. Third Modification)

Figure 14:
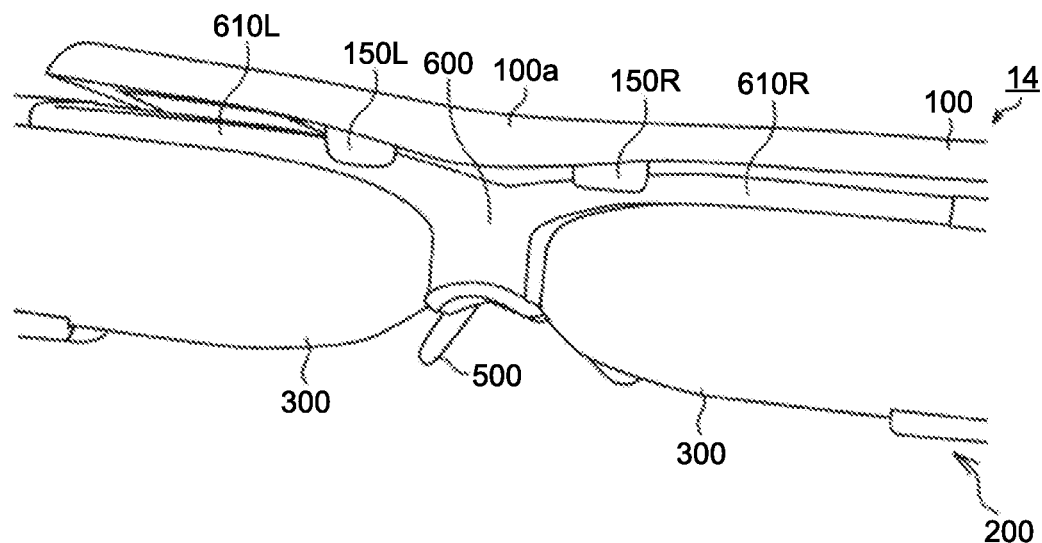
FIG. 14 is a view for explaining a third modification.

FIG. 14 is a view for explaining a third modification. FIG. 14 illustrates a perspective view of a right-left central part of a head-mounted display 14 as viewed from the front side (front).

In the embodiment and the first and second modifications described above, the limitation ribs are provided on the image display device 200 side. In the third modification, however, limitation ribs 150L and 150R are provided on the frame 100 side. Specifically, in the third modification, the frame 100 has the limitation ribs 150L and 150R projecting downward from the lower surface of the front part 100a.

Parts of the limitation ribs 150L and 150R are disposed in front of the reinforcement parts 610L and 610R of the image display device 200.

In the third modification, the limitation ribs 150L and 150R serving as parts of the front part 100a of the frame 100 are disposed so as to face the reinforcement parts 610L and 610R of the reinforcement member 600 serving as the parts of the image display device 200, with predetermined gaps interposed therebetween. Also in the third modification, the reinforcement parts 610L and 610R serving as the parts of the image display device 200 are disposed closer to the face of the user than the limitation ribs 150L and 150R serving as the parts of the front part 100a so as to face the face of the user. This configuration limits the movement range of the relative rotation of the image display device 200 about the connection position of the connection between the image display device 200 and the frame 100 by the connection member 400, and can restrain the connection member 400 from being deformed or broken when the frame 100 and the image display device 200 relatively rotate.

The limitation ribs 150L and 150R are not particularly limited in shape. The configuration of the rotation limiting structure of the above-described embodiment can be employed as appropriate as a configuration other than that described above, including, for example, the width of the gap between each of the limitation ribs 150L and 150R and corresponding one of the reinforcement parts 610L and 610R of the reinforcement member 600, and the contact position of each of the limitation ribs 150L and 150R with corresponding one of the reinforcement parts 610L and 610R.

In the third modification, the reinforcement parts 610L and 610R of the reinforcement member 600 of the image display device 200 may be provided with limitation grooves in which parts of the limitation ribs 150L and 150R of the front part 100a of the frame 100 are disposed. Alternatively, in the third modification, forward facing surfaces on the reinforcement parts 610L and 610R of the reinforcement member 600 of the image display device 200 may be provided with recesses in which the parts of the limitation ribs 150L and 150R of the front part 100a are disposed. In either case, side surfaces of the limitation grooves or the recesses of the reinforcement parts 610L and 610R facing the direction opposite to the face of the user are disposed so as to face the limitation ribs 150L and 150R of the front part 100a with predetermined gaps interposed therebetween, and thus, the rotation limiting structures are provided.

As described above, the first to third modifications can also improve the fracture strength of the connection member 400 in the same way as in the case of the head-mounted display 10 according to the first embodiment described above.

2. Second Embodiment

Figure 15:
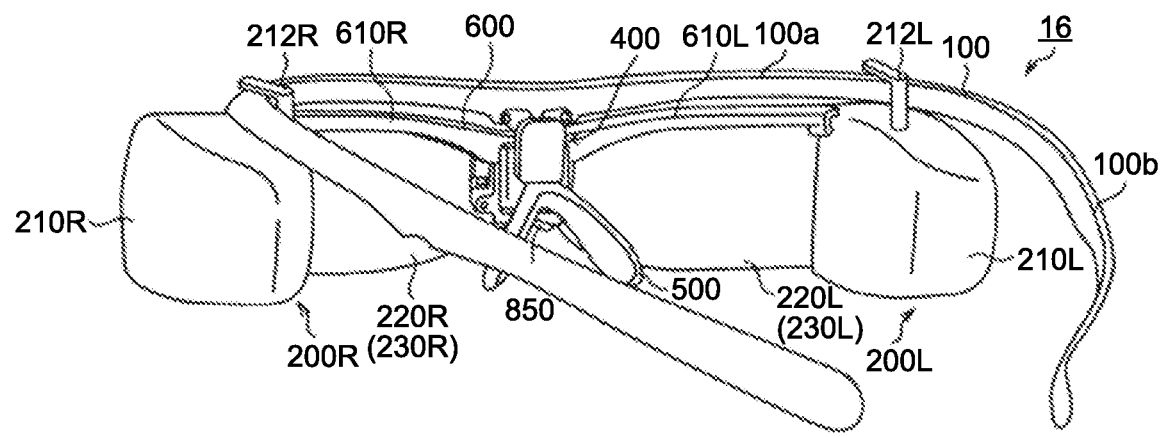
FIG. 15 is a rear perspective view of a head-mounted display according to a second embodiment of the present disclosure.

The following describes a configuration example of a head-mounted display 16 according to a second embodiment of the present disclosure with reference to FIG. 15. In the head-mounted display 10 according to the first embodiment, the reinforcement member 600 of the image display device 200 is used to provide the rotation limiting structures. In the head-mounted display 16 according to the second embodiment, however, the image generation devices 210L and 210R of the optical modules 200L and 200R are used to provide the rotation limiting structures. The following mainly describes differences of the head-mounted display 16 according to the present embodiment from the head-mounted display 10 according to the first embodiment.

FIG. 15 is a perspective view obtained by viewing the head-mounted display 16 from the backside (rear). As illustrated in FIG. 15, the two right and left image generation devices 210L and 210R has limitation ribs 212L and 212R projecting upward from upper surfaces thereof. The limitation ribs 212L and 212R are located closer to the face of the user than the front part 100a at both the right and left ends of the front part 100a of the frame 100.

When no external force is applied to the image display device 200, the limitation ribs 212L and 212R provided on the image generation devices 210L and 210R are disposed so as not to contact the front part 100a at least in the front-rear direction. Specifically, each of the limitation ribs 212L and 212R is disposed so as to face the front part 100a in the front-rear direction, with the predetermined gap S interposed therebetween. Each of The limitation ribs 212L and 212R of the image generation devices 210L and 210R serving as a part of the image display device 200 and a part of the front part 100a constitute the rotation limiting structure that limits the rotational movement range of the image display device 200.

Figure 16:
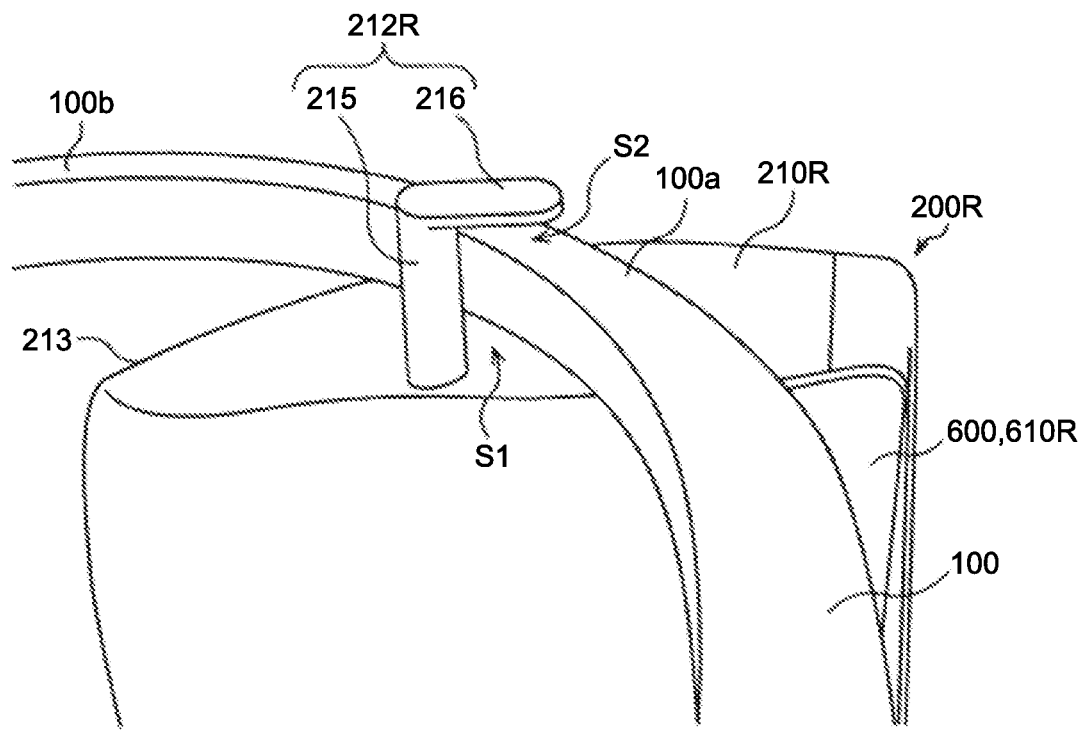
FIG. 16 is a view for explaining the rotation limiting structure of the head-mounted display according to the second embodiment.

FIG. 16 is a view for explaining the rotation limiting structure of the head-mounted display 16 according to the present embodiment. FIG. 16 is a view obtained by viewing the optical module 200R as one of the optical modules from the right-left central part of the head-mounted display 16. The rotation limiting structures are symmetrically provided on both the right and left sides of the head-mounted display 16, and since the rotation limiting structure on the optical module 200L side as the other of the optical modules is configured in the same way as the rotation limiting structure illustrated in FIG. 16, no description thereof will be given herein.

The limitation rib 212R provided on the upper surface of the image generation device 210R has a rotation limiting part 215 and a restraining part 216. The rotation limiting part 215 is provided so as to extend upward from an upper surface of the housing 213 of the image generation device 210R. The restraining part 216 is provided continuously from the rotation limiting part 215, and extends forward substantially orthogonal to a direction of extension of the rotation limiting part 215. In other words, the limitation rib 212R illustrated in FIG. 16 has what is called a hook shape.

The rotation limiting part 215 is disposed closer to the face of the user than the front part 100a of the frame 100 so as to face the face of the user with the predetermined gap S interposed therebetween. When the user holds and moves forward the image generation device 210R, if the frame 100 is caught on the face and only the image display device 200 rotates, the rotation limiting part 215 of the limitation rib 212R provided on the image generation device 210R contacts the front part 100a of the frame 100. This contact limits the movement range of the relative rotation of the image display device 200 about the connection position of the connection between the frame 100 and the image display device 200 by the connection member 400.

The restraining part 216 is disposed above the frame 100 with a predetermined gap S2 interposed therebetween. The restraining part 216 has a function of limiting the upward movement of the front part 100a of the frame 100 so as to prevent the front part 100a from moving beyond the limitation rib 212R to a rear side thereof. The width of the gap S2 between the restraining part 216 and the front part 100a may be set to an appropriate size taking into account an amount of deflection of the frame 100 according to the material cost and design conditions of the frame 100.

In the present embodiment, although the restraining part 216 is not an essential component, the limitation rib 212R can more reliably limit the rotational movement range of the image display device 200 by having the restraining part 216.

The limitation ribs 212L and 212R each having the rotation limiting part 215 and the restraining part 216 are not limited in shape to the example illustrated in FIG. 16. For example, the limitation ribs 212L and 212R may have curved shapes that rise upward from the upper surfaces of the image generation devices 210L and 210R, and bend to change in extending direction to a forward direction to be disposed above the frame 100.

In the head-mounted display 16 according to the present embodiment, the image generation devices 210L and 210R are provided with the limitation ribs 212L and 212R, which cooperate with the front part 100a of the frame 100 to provide the rotation limiting structures. This configuration eliminates the need for provision of the reinforcement member 600 other than the connection member 400 that connects the frame 100 to the connection member 400.

In the head-mounted display 16 according to the present embodiment, the image generation devices 210L and 210R are provided with the limitation ribs 212L and 212R having the restraining parts 216. The present disclosure is not limited to the example in which the limitation ribs having the restraining parts are provided on the image generation devices 210L and 210R. The limitation ribs having the restraining parts 216 may be provided, for example, on the reinforcement member 600.

The above has described the head-mounted display 16 according to the second embodiment. In the head-mounted display 16 according to the present embodiment, the image generation devices 210L and 210R on both the right and left sides of the image display device 200 are provided with the limitation ribs 212L and 212R. The limitation ribs 212L and 212R are disposed so as to face the front part 100a of the frame 100 in the front-rear direction, with the predetermined gaps S1 interposed therebetween. The limitation ribs 212L and 212R on the image display device 200 side are disposed closer to the face of the user (viewer) than the front part 100a of the frame 100 so as to face the face of the user.

Accordingly, even if the frame 100 is caught on the face when the user holds the part of the image display device 200 and removes the head-mounted display 16 from the face, the movement range of the rotation of the image display device 200 is limited relative to the frame 100. This configuration can reduce the external force that acts on the connection position C of the connection between the frame 100 and the image display device 200 by the connection member 400, and thus restrain the connection member 400 from being deformed or broken.

In the head-mounted display 16 according to the present embodiment, each of the limitation ribs 212L and 212R has the restraining part 216 together with the rotation limiting part 215. Therefore, although the limitation ribs 212L and 212R are provided in positions distant from the connection position C of the connection between the frame 100 and the image display device 200 by the connection member 400, the front part 100a can be less likely to move over the limitation ribs 212L and 212R due to, for example, a deflection of the frame 100. As a result, the movement range of the rotation of the image display device 200 relative to the frame 100 can be more reliably limited.

The head-mounted display 16 according to the present embodiment need not be greatly changed in configuration from the conventional head-mounted display, except that the right and left image generation devices 210L and 210R are provided with the limitation ribs 212L and 212R.

Since the rotation limiting structures of the head-mounted display 16 according to the present embodiment have the relatively simple configuration using the limitation ribs 212L and 212R, the fracture strength of the connection member 400 can be improved without incurring any significant increase in weight and manufacturing cost.

While the preferred embodiments of the present disclosure have been described in detail with reference to the accompanying drawings, the present disclosure is not limited such examples. Those having ordinary knowledge in the field of art to which the present disclosure belongs can naturally conceive of various changes or modifications within the scope of technical ideas described in the claims, and it is understood that such changes or modifications also naturally belong to the technical scope of the present disclosure.

For example, in the head-mounted display according to each of the above-described embodiments, the connection member is bonded to the back surface side of the central part of the optical plate, and the reinforcement member is bonded to the front surface side thereof. However, the technique of the present disclosure is not limited to such an example. In the case of a configuration in which the connection member is integrated with the reinforcement member, and the connection member supports the two right and left optical modules and is connected at the central part thereof to the frame, the connection member may be configured in the same way as the reinforcement member in each of the above-described embodiments. For example, the connection member may be provided with the same limitation ribs as those of the reinforcement member.

In the head-mounted display according to each of the above-described embodiments, the optical plate 300 connects together the two right and left optical modules 200L and 200R, and the optical plate 300 is bonded to the reinforcement member 600 only on the surface of the central part of the optical plate 300 opposite to the face of the user. However, the technique of the present disclosure is not limited to such an example. For example, the two right and left optical modules 200L and 200R may be directly supported by and connected to the reinforcement member 600 without using the optical plate. In this case, the reinforcement member 600 has both the function of supporting the two right and left optical modules 200L and 200R and a function of increasing the stiffness of the light guide plates 220L and 220R.

In the head-mounted display according to each of the above-described embodiments, the part of the image display device on the side thereof held by the user when the user removes the head-mounted display contacts a part of the front part of the frame disposed in front of the image display device so as to face the image display device, and thereby, the movement range of the relative rotation between the frame and the image display device is limited. However, the technique of the present disclosure is not limited to such an example. For example, a part of the image display device on a side opposite to the side thereof held by the user when the user removes the head-mounted display may contact a part of the front part of the frame disposed behind the image display device so as to face the image display device, and thereby, the movement range of the relative rotation between the frame and the image display device may be limited.

Figure 17:
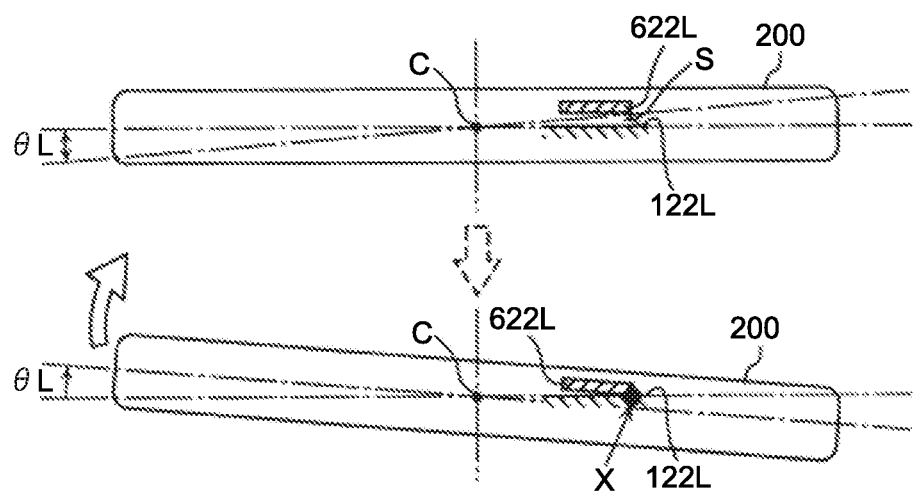
FIG. 17 is a diagram for explaining a configuration example in which a part of a front part of a frame is disposed so as to face a rear side of a part of an image display device.

FIG. 17 is a schematic diagram illustrating a limitation rib 622L serving as the part of the image display device 200 and a side surface 122L serving as the part of the front part of the frame disposed behind the limitation rib 622L so as to face the limitation rib 622L. If the frame is caught on the face when the user tries to remove the head-mounted display by holding the left side of the illustrated image display device 200, the frame and the image display device 200 relatively rotate about the connection position (C) of the connection between the frame and the image display device by the connection member. In this case, the limitation rib 622L provided on the image display device 200 on the right side of the connection position (C) contacts the side surface 122L disposed behind the limitation rib 622L so as to face the limitation rib 622L in the contact position X. This contact limits the movement range of the relative rotation between the frame and the image display device. Also in the example illustrated in FIG. 17, the width of the gap S between the limitation rib 622L and the side surface 122L may be set taking into account the elastic limit angle $\theta_L$, of the connection member.

The head-mounted display according to each of the above-described embodiments includes the optical modules in each of which the cutout parts of the light guide plate are provided with the first deflection unit and the second deflection unit. However, the technique of the present disclosure is not limited to such an example. The head-mounted display may include optical modules in each of which a surface of the light guide plate is provided with the first deflection unit and the second deflection unit constituted by, for example, reflective volume hologram diffraction gratings.

The effects described in the present specification are merely explanatory or exemplary, and not limiting. In other words, the technique according to the present disclosure can exhibit other effects apparent to those skilled in the art from the description of the present specification, in addition to or instead of the effects described above.

The following configurations also belong to the technical scope of the present disclosure.

(1) A head-mounted display comprising:
a frame configured to be worn on the head of a viewer, and having a front part to be disposed in front of the viewer; and
an image display device connected to a central part of the front part,
the image display device comprising:
two right and left optical modules each comprising an image generation device and a light guide unit that is connected to the image generation device and is disposed closer as a whole to a center of the face of the viewer than the image generation device; and
a connection member connecting the image display device to the front part, wherein
a part of the image display device is disposed so as to face a part of the front part in a front-rear direction with a predetermined gap interposed therebetween.

(2) The head-mounted display according to (1), wherein the part of the image display device is disposed closer to the face of the viewer than the part of the front part so as to face the part of the front part.

(3) The head-mounted display according to (1) or (2), wherein either one of the part of the image display device and the part of the front part is a rib.

(4) The head-mounted display according to (3), wherein either one of the part of the image display device and the part of the front part disposed so as to face the rib is a side surface of a groove in which the rib is disposed.

(5) The head-mounted display according to any one of (1) to (4), wherein
the image display device comprises a reinforcement member that reinforces or supports the two optical modules, and
the part of the image display device disposed so as to face the part of the front part is a part of the reinforcement member.
(6) The head-mounted display according to (5), wherein the part of the image display device is a rib provided on the reinforcement member.
(7) The head-mounted display according to any one of (1) to (4), wherein
the two optical modules are connected by the connection member, and
the part of the image display device disposed so as to face the part of the front part is a part of the connection member.
(8) The head-mounted display according to (7), wherein the part of the image display device is a rib provided on the connection member.
(9) The head-mounted display according to any one of (1) to (4), wherein the part of the image display device is a rib provided on the image generation device.
(10) The head-mounted display according to (1) or (2), wherein the part of the image display device disposed so as to face the part of the front part is a rib, and the rib has a restraining part located above the front part.
(11) The head-mounted display according to any one of (1) to (10), wherein, on each of both right and left sides of the head-mounted display, the part of the image display device is disposed so as to face the part of the front part in the front-rear direction with the predetermined gap interposed therebetween.
(12) The head-mounted display according to any one of (1) to (10), wherein the part of the image display device disposed so as to face the part of the front part is provided in one body across both right and left sides of the head-mounted display.
(13) The head-mounted display according to any one of (1) to (12), wherein the frame and the image display device are configured to relatively rotate about a connection position of connection therebetween by the connection member so as to allow the part of the image display device and the part of the front part disposed so as to face each other to contact each other, and the part of the image display device is configured to contact the part of the front part in a position closer to the connection position than to the image generation device.
(14) The head-mounted display according to any one of (1) to (12), wherein the frame and the image display device are configured to relatively rotate about a connection position of connection therebetween by the connection member so as to allow the part of the image display device and the part of the front part disposed so as to face each other to contact each other, and the part of the image display device is configured to contact the part of the front part in a position closer to the image generation device than to connection position.
(15) The head-mounted display according to any one of (1) to (14), wherein a width (A) of the predetermined gap satisfies expression (1) below.

$$0 < A \leq L \times \tan \theta_L \quad (1)$$

where
L is distance from the center of the relative rotation between the frame and the image display device to the contact position between the part of the image display device and the part of the front part disposed so as to face each other, and
$\theta_L$ is an elastic limit angle of the connection member

REFERENCE SIGNS LIST

10 Head-mounted display
100 Frame
100a Front part
100b Temple
110L, 110R Limitation groove
120L, 120R Side surface
200 Image display device
200L, 200R Optical module
210L, 210R Image generation device
220L, 220R Light guide plate
230L, 230R Light guide unit
300 Optical plate
400 Connection member
500 Nose pad
600 Reinforcement member
610L, 610R Reinforcement part
620L, 620R Limitation rib
C Connection position (rotation center)
X Contact position

The invention claimed is:
1. A head-mounted display comprising:
a frame configured to be worn on a head of a viewer, and having a front part to be disposed in front of the viewer; and
an image display device connected to a central part of the front part,
the image display device comprising:
two right and left optical modules each comprising an image generation device and a light guide unit that is connected to the image generation device and is disposed closer as a whole to a center of a face of the viewer than the image generation device; and
a connection member connecting the image display device to the front part, wherein
a part of the image display device is disposed so as to face a part of the front part in a front-rear direction with a predetermined gap interposed therebetween.
2. The head-mounted display according to claim 1, wherein the part of the image display device is disposed closer to the face of the viewer than the part of the front part so as to face the part of the front part.
3. The head-mounted display according to claim 1, wherein either one of the part of the image display device and the part of the front part is a rib.
4. The head-mounted display according to claim 3, wherein either one of the part of the image display device and the part of the front part disposed so as to face the rib is a side surface of a groove in which the rib is disposed.
5. The head-mounted display according to claim 1, wherein
the image display device comprises a reinforcement member that reinforces or supports the two optical modules, and
the part of the image display device disposed so as to face the part of the front part is a part of the reinforcement member.
6. The head-mounted display according to claim 5, wherein the part of the image display device is a rib provided on the reinforcement member.
7. The head-mounted display according to claim 1, wherein
the two optical modules are connected by the connection member, and the part of the image display device disposed so as to face the part of the front part is a part of the connection member.

8. The head-mounted display according to claim 7, wherein the part of the image display device is a rib provided on the connection member.

9. The head-mounted display according to claim 1, wherein the part of the image display device is a rib provided on the image generation device.

10. The head-mounted display according to claim 1, wherein the part of the image display device disposed so as to face the part of the front part is a rib, and the rib has a restraining part located above the front part.

11. The head-mounted display according to claim 1, wherein, on each of both right and left sides of the head-mounted display, the part of the image display device is disposed so as to face the part of the front part in the front-rear direction with the predetermined gap interposed therebetween.

12. The head-mounted display according to claim 1, wherein the part of the image display device disposed so as to face the part of the front part is provided in one body across both right and left sides of the head-mounted display.

13. The head-mounted display according to claim 1, wherein
the frame and the image display device are configured to relatively rotate about a connection position of connection therebetween by the connection member so as to allow the part of the image display device and the part of the front part disposed so as to face each other to contact each other, and
the part of the image display device is configured to contact the part of the front part in a position closer to the connection position than to the image generation device.

14. The head-mounted display according to claim 1, wherein
the frame and the image display device are configured to relatively rotate about a connection position of connection therebetween by the connection member so as to allow the part of the image display device and the part of the front part disposed so as to face each other to contact each other, and
the part of the image display device is configured to contact the part of the front part in a position closer to the image generation device than to connection position.

15. The head-mounted display according to claim 1, wherein a width (A) of the predetermined gap satisfies expression (1) below, $$0 < A \leq L \times \tan \theta_L \qquad (1)$$

where
L is distance from a center of relative rotation between the frame and the image display device to a contact position between the part of the image display device and the part of the front part disposed so as to face each other, and
$\theta_L$ is an elastic limit angle of the connection member.

* * * * *